United States Patent
Cleary et al.

(10) Patent No.: US 10,035,724 B2
(45) Date of Patent: Jul. 31, 2018

(54) METHODS OF MANUFACTURING A THIN GLASS PANE

(71) Applicant: CORNING INCORPORATED, Corning, NY (US)

(72) Inventors: Thomas Michael Cleary, Elmira, NY (US); Larry Gene Smith, Tulsa, OK (US); Chad M. Wilcox, Corning, NY (US); Chunhe Zhang, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 254 days.

(21) Appl. No.: 14/185,254

(22) Filed: Feb. 20, 2014

(65) Prior Publication Data
US 2014/0239034 A1 Aug. 28, 2014

Related U.S. Application Data

(60) Provisional application No. 61/768,887, filed on Feb. 25, 2013.

(51) Int. Cl.
*C03B 33/04* (2006.01)
*C03B 33/033* (2006.01)
*C03B 33/03* (2006.01)

(52) U.S. Cl.
CPC ............ *C03B 33/04* (2013.01); *C03B 33/03* (2013.01); *C03B 33/033* (2013.01); *Y02P 40/57* (2015.11); *Y10T 225/12* (2015.04)

(58) Field of Classification Search
CPC ....... C03B 33/04; C03B 33/03; C03B 33/033; Y02P 40/57; Y10T 225/12

(Continued)

(56) References Cited

U.S. PATENT DOCUMENTS

| 471,103 A | 3/1892 | Cudner |
| 2,507,841 A | 5/1950 | Upton |

(Continued)

FOREIGN PATENT DOCUMENTS

| CN | 1930097 | 3/2007 | ........... C03B 33/033 |
| CN | 101980063 | 2/2011 | ............. G02B 7/185 |

(Continued)

OTHER PUBLICATIONS

Phillip McKey. How to Score and Break an Inside Curve in Stained Glass. http://www.monkeysee.com/play/5787-how-to-score-and-break-an-inside-curve-in-stained-glass. Jan. 28, 2009. Document titled "How to Score and Break an Inside Curve in Stained Glass" includes screenshots of the video from pertinent moments, attached.*

(Continued)

*Primary Examiner* — Sean Michalski
(74) *Attorney, Agent, or Firm* — F. Brock Riggs

(57) ABSTRACT

Methods of manufacturing a glass pane comprise the steps of providing a glass sheet with a thickness of less than about 1.6 mm between a first major surface and a second major surface of the glass sheet. The methods include scoring the first major surface of the glass sheet to provide a boundary score line and a relief score line. In some examples, the method provides a relief score depth that is greater than a boundary score depth. In another example, the method includes the step of placing the glass sheet on a conveyor belt including a Shore A hardness of greater than or equal to 70. In further examples, methods of breaking a glass sheet with an oversized template are provided.

9 Claims, 3 Drawing Sheets

(58) Field of Classification Search
USPC .................................................. 225/2, 20
See application file for complete search history.

(56) References Cited

U.S. PATENT DOCUMENTS

| | | | |
|---|---|---|---|
| 3,178,085 A | 4/1965 | Friedrich | |
| 3,555,944 A | 1/1971 | Imamura | 83/12 |
| 3,790,748 A | 2/1974 | Van Laethem et al. | 219/219 |
| 3,913,812 A | 10/1975 | Augustin et al. | 225/2 |
| 3,945,278 A | 3/1976 | Strauss et al. | 83/12 |
| 4,033,490 A | 7/1977 | Ulivi | 225/1 |
| 4,106,683 A | 8/1978 | Gulish, Jr. | 225/103 |
| 4,136,807 A | 1/1979 | Detorre | |
| 4,196,830 A * | 4/1980 | Oravitz, Jr. | C03B 33/0235 225/2 |
| 4,371,103 A | 2/1983 | Siemens | |
| 4,483,700 A | 11/1984 | Forker et al. | |
| 4,511,618 A | 4/1985 | Duchene et al. | 428/215 |
| 5,674,790 A | 10/1997 | Araujo | |
| 6,112,967 A | 9/2000 | Ostendarp | |
| 6,463,762 B1 | 10/2002 | Ross, Jr. | 65/105 |
| 6,480,335 B1 | 11/2002 | Nakaho et al. | 359/584 |
| 7,666,511 B2 | 2/2010 | Ellison et al. | |
| 8,986,072 B2 | 3/2015 | Darcangelo et al. | |
| 2006/0081673 A1 | 4/2006 | Schenk | |
| 2010/0294748 A1 * | 11/2010 | Garner | C03B 33/0215 219/121.72 |
| 2011/0085257 A1 | 4/2011 | O'Connor et al. | 359/868 |
| 2011/0226832 A1 | 9/2011 | Bayne et al. | 225/2 |
| 2012/0094084 A1 | 4/2012 | Fisher et al. | |
| 2012/0199625 A1 | 8/2012 | Qi et al. | 225/2 |
| 2012/0328843 A1 | 12/2012 | Cleary et al. | |
| 2013/0086948 A1 | 4/2013 | Bisson et al. | |
| 2013/0125589 A1 | 5/2013 | Dannoux et al. | |
| 2013/0125592 A1 | 5/2013 | Bisson | |
| 2013/0127202 A1 | 5/2013 | Hart | |
| 2013/0295357 A1 | 11/2013 | Cleary et al. | |
| 2013/0319046 A1 | 12/2013 | Cleary et al. | |
| 2013/0323415 A1 | 12/2013 | Brackley et al. | |
| 2014/0087159 A1 | 3/2014 | Cleary et al. | |
| 2014/0087193 A1 | 3/2014 | Cites et al. | |
| 2014/0141217 A1 | 5/2014 | Gulati et al. | |
| 2014/0239034 A1 | 8/2014 | Cleary et al. | |
| 2014/0356604 A1 | 12/2014 | Borrelli et al. | |
| 2015/0064374 A1 | 3/2015 | Jain et al. | |
| 2015/0111016 A1 | 4/2015 | Fisher et al. | |
| 2015/0122406 A1 | 5/2015 | Fisher et al. | |
| 2015/0132538 A1 | 5/2015 | Cleary et al. | |
| 2015/0140301 A1 | 5/2015 | Fisher et al. | |
| 2015/0158275 A1 | 6/2015 | D'Errico et al. | |
| 2015/0158277 A1 | 6/2015 | Fisher et al. | |
| 2015/0232366 A1 | 8/2015 | Fredholm et al. | |
| 2015/0232367 A1 | 8/2015 | Joubaud et al. | |
| 2015/0251377 A1 | 9/2015 | Cleary et al. | |
| 2015/0274571 A1 | 10/2015 | Brennan et al. | |
| 2015/0321940 A1 | 11/2015 | Dannoux et al. | |
| 2016/0082705 A1 | 3/2016 | Fisher et al. | |
| 2016/0145139 A1 | 5/2016 | Fredholm et al. | |

FOREIGN PATENT DOCUMENTS

| | | | |
|---|---|---|---|
| DE | 19652940 | 6/1998 | |
| DE | 102008017485 | 4/2010 | |
| DE | 102008042855 | 4/2010 | C03B 33/04 |
| EP | 0217658 | 4/1987 | C03B 33/00 |
| GB | 1012343 | 12/1965 | C03B 33/04 |
| GB | 1366639 | 9/1974 | C03B 33/02 |
| IT | 1377576 | 7/2010 | |
| JP | 59030727 | 2/1984 | B26F 3/00 |
| JP | 2005225713 | 8/2005 | |
| JP | 2006240948 | 9/2006 | C03B 33/09 |
| JP | 2009190905 | 8/2009 | |
| JP | 2012171867 | 9/2012 | C03B 33/027 |
| JP | 2012254927 | 12/2012 | |
| JP | 201314107 | 1/2013 | |
| JP | 201083015 | 4/2015 | |
| KR | 1129830 | 3/2012 | C03B 33/02 |
| KR | 1127230 | 4/2012 | |
| WO | 2009060691 | 5/2009 | |
| WO | WO2009/060691 | 5/2009 | C03B 33/07 |
| WO | WO2012/047248 | 4/2012 | B32B 33/033 |
| WO | 2015031148 A1 | 3/2015 | |
| WO | 2015031151 A1 | 3/2015 | |
| WO | 2015031594 A2 | 3/2015 | |
| WO | 2015054112 A1 | 4/2015 | |

OTHER PUBLICATIONS

International Search Report and Written Opinion, dated Jun. 5, 2014, International Application No. PCT/US2014/017085, International Filing Date Feb. 19, 2014.

International Preliminary Report on Patentability received in International Application No. PCT/US2014/017085, dated Sep. 3, 2015 (12 pages).

Machine Translation of DE102008042855, Apr. 22, 2010 (13 pages).

Machine Translation of DE19652940, Jun. 25, 1998 (13 pages).

English Translation of JP2015558918 Notice of Grounds for Rejection dated Aug. 23, 2016; 2 Pages; Japanese Patent Office.

* cited by examiner

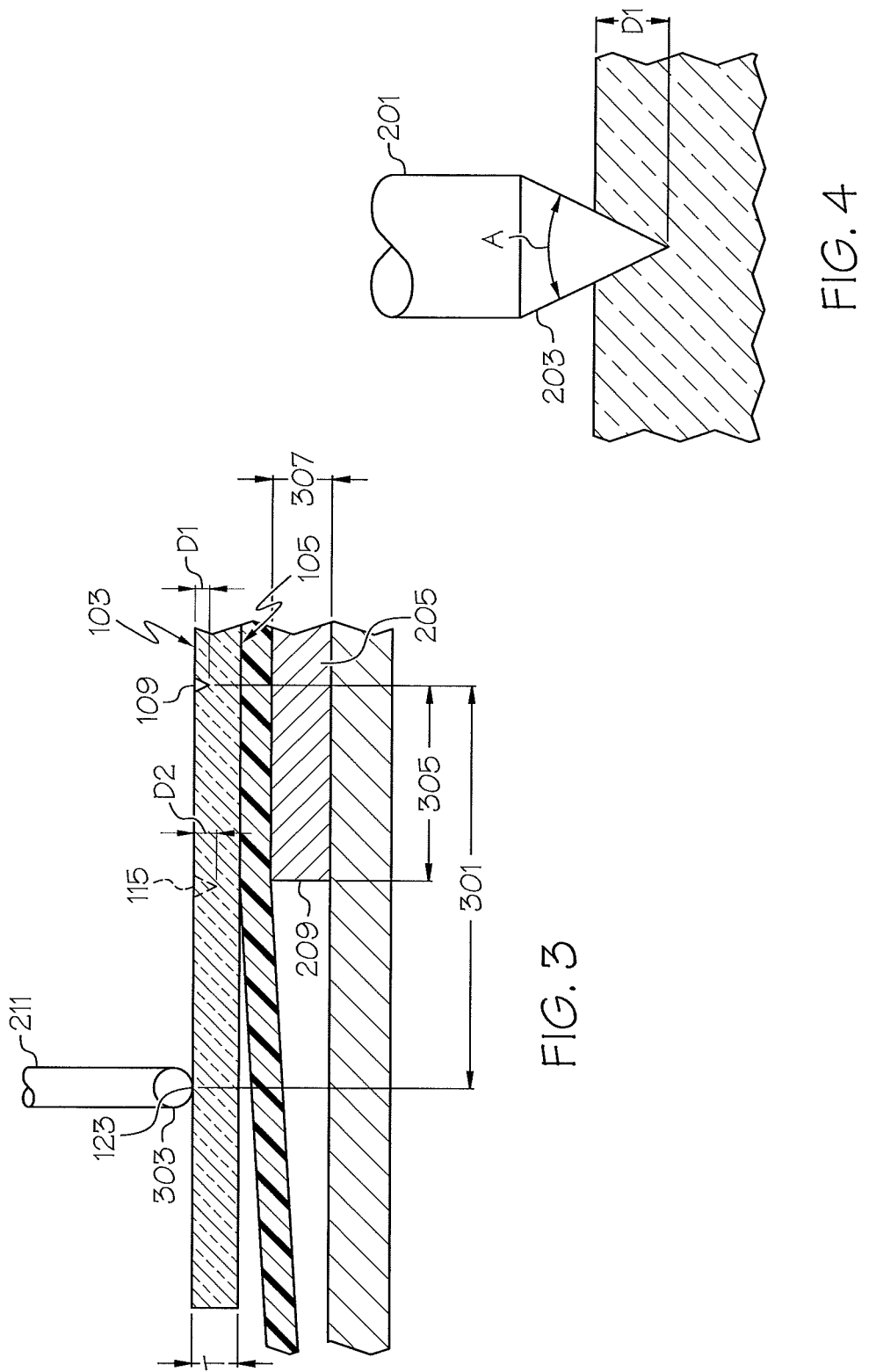

METHODS OF MANUFACTURING A THIN GLASS PANE

This application claims the benefit of priority to U.S. Provisional Application No. 61/768,887 filed on Feb. 25, 2013 the content of which is incorporated herein by reference in its entirety.

FIELD

The present invention relates generally to methods of manufacturing a thin glass pane and, more particularly, to methods of manufacturing a thin glass pane including the steps of scoring the first major surface of a glass sheet to provide a boundary score line and a relief score line.

BACKGROUND

It is known to produce windows of a motor vehicle with glass panes formed from relatively thick soda lime glass. Glass windows for motor vehicles can comprise glass and/or glass laminates with an overall thickness of 4 mm. Such glass window configurations may provide sufficient strength. However, the relatively thick glass windows can add extra weight to the vehicle that can reduce gas mileage and increase $CO_2$ emissions of the vehicle.

SUMMARY

The following presents a simplified summary of the disclosure in order to provide a basic understanding of some example aspects described in the detailed description.

In accordance with a first example aspect of the disclosure, a method of manufacturing a glass pane comprising the step (I) of providing a glass sheet with a thickness of less than about 1.6 mm between a first major surface and a second major surface of the glass sheet. The method further includes the step (II) of scoring the first major surface of the glass sheet to provide a boundary score line with a boundary score depth. The boundary score line at least partially circumscribes a central target area of the glass sheet to define a separation line between the central target area and an outer peripheral area of the glass sheet. The outer peripheral area at least partially circumscribes the central target area of the glass sheet. The method further includes the step (III) of scoring the first major surface of the glass sheet to provide at least one relief score line with a relief score depth. The relief score line is defined in the outer peripheral area and extends toward boundary score line. The relief score depth is greater than the boundary score depth. The method further includes the step (IV) of breaking away the outer peripheral area of the glass sheet from the central target area of the glass sheet along the separation line.

In accordance with one example of the first aspect, step (II) scores the first major surface of the glass sheet such that the boundary score depth is from about 10% to about 20% of the thickness of the glass sheet.

In accordance with another example of the first aspect, step (III) scores the first major surface of the glass sheet such that the relief score depth is from about 20% to about 50% of the thickness of the glass sheet.

In accordance with yet another example of the first aspect, step (III) provides the at least one relief score line as a plurality of relief score lines that are radially spaced about the central target area and each extend in a direction towards the central target area.

In accordance with still another example of the first aspect, step (IV) includes applying a breaking force along a force application path positioned within the outer peripheral area and circumscribing the central target area. For example, step (IV) can include applying the breaking force with a force applicator that travels along the force application path. In addition or alternatively, step (IV) can provide the force application path spaced a distance from the separation line of from about 6 mm to about 18 mm.

In accordance with another example of the first aspect, step (III) scores the first major surface such that the at least one relief score line extends toward the boundary score line to an end point located within the outer peripheral area and spaced by a gap from the boundary score line.

The first aspect may be carried out alone or in combination with one or any combination of the examples of the first aspect discussed above.

In accordance with a second aspect of the disclosure, a method of manufacturing a glass pane comprises the step (I) of providing a glass sheet with a thickness of less than about 1.6 mm between a first major surface and a second major surface of the glass sheet. The method further includes the step (II) of placing the glass sheet on a conveyor belt including a Shore A hardness of greater than or equal to 70. The method further includes the step (III) of scoring the first major surface of the glass sheet supported by the conveyor belt to provide a boundary score line at least partially circumscribing a central target area of the glass sheet to define a separation line between the central target area and an outer peripheral area of the glass sheet. The outer peripheral area at least partially circumscribes the central target area of the glass sheet. The method further includes the step (IV) of scoring the first major surface of the glass sheet supported by the conveyor belt to provide at least one relief score line defined in the outer peripheral area and extending toward the boundary score line. The method further includes the step (V) of breaking away the outer peripheral area of the glass sheet from the central target area of the glass sheet along the separation line.

In accordance with one example of the second aspect, the method comprises the step of supporting the conveyor belt with a substantially rigid template having a larger footprint than a footprint of the central target area and wherein the template includes an outer periphery that is geometrically similar to the separation line. In one example, the template optionally has a thickness of from about 1.5 mm to about 3 mm. In addition or alternatively, in another example, the template is aligned with the central target area such that an oversize dimension between the outer periphery of the template and the separation line from about 1.5 mm to about 3 mm.

In accordance with another example of the second aspect, step (II) includes scoring the first major surface of the glass sheet to provide the boundary score line with a boundary score depth. Furthermore, step (III) includes scoring the first major surface of the glass sheet to provide the at least one relief score line with a relief score depth, wherein the relief score depth is greater than the boundary score depth.

In yet another example of the second aspect, step (II) scores the first major surface of the glass sheet such that a boundary score depth of the boundary score line is from about 10% to about 20% of the thickness of the glass sheet.

In still another example of the second aspect, step (III) scores the first major surface of the glass sheet such that a relief score depth of the relief score line is from about 20% to about 50% of the thickness of the glass sheet.

In another example of the second aspect, step (V) includes applying a breaking force with a force applicator that travels along a force application path positioned within the outer peripheral area and circumscribing the central target area. In one optional example, step (V) provides the force application path spaced a distance from the separation line of from about 6 mm to about 18 mm.

In still another example of the second aspect, step (III) scores the first major surface such that the at least one relief score line extends toward the boundary score line to an end point located within the outer peripheral area and spaced by a gap from the boundary score line.

The second aspect may be carried out alone or in combination with one or any combination of the examples of the second aspect discussed above.

In accordance with a third example aspect, a method of manufacturing a glass pane comprises the step (I) of providing a glass sheet with a thickness of less than about 1.6 mm between a first major surface and a second major surface of the glass sheet. The method further includes the step (II) of placing the glass sheet on a conveyor belt supported with a substantially rigid template including a thickness of from about 1.5 mm to about 3 mm. The method still further includes the step (III) of scoring the first major surface of the glass sheet supported by the conveyor belt to provide a boundary score line at least partially circumscribing a central target area of the glass sheet to define a separation line between the central target area and an outer peripheral area of the glass sheet. The outer peripheral area at least partially circumscribes the central target area of the glass sheet, the rigid template includes a footprint that is larger than a footprint of the central target area, and the template includes an outer periphery that is geometrically similar to the separation line. The method further includes the step (IV) of scoring the first major surface of the glass sheet supported by the conveyor belt to provide at least one relief score line defined in the outer peripheral area and extending toward the boundary score line. The method still further includes the step (V) of aligning the template with the central target area such that an oversize dimension between the outer periphery of the template and the separation line from about 1.5 mm to about 3 mm. The method still further includes the step (VI) of applying a breaking force with a force applicator traveling along a force application path positioned within the outer peripheral area and circumscribing the central target area to break away the outer peripheral area of the glass sheet from the central target area of the glass sheet along the separation line. The force application path is spaced a distance from the separation line of from about 6 mm to about 18 mm.

The third aspect can be provided alone or in combination with providing the conveyor belt with a Shore A hardness of greater than or equal to 70.

BRIEF DESCRIPTION OF THE DRAWINGS

These and other features, aspects and advantages of the present disclosure are better understood when the following detailed description is read with reference to the accompanying drawings, in which:

FIG. 3 is an enlarged view of the force applicator in relation to the boundary score line and the peripheral edge of the template shown in FIG. 2;

FIG. 4 is an enlarged view of the scoring device scoring the boundary score line shown in FIG. 2.

DETAILED DESCRIPTION

Figure 1:
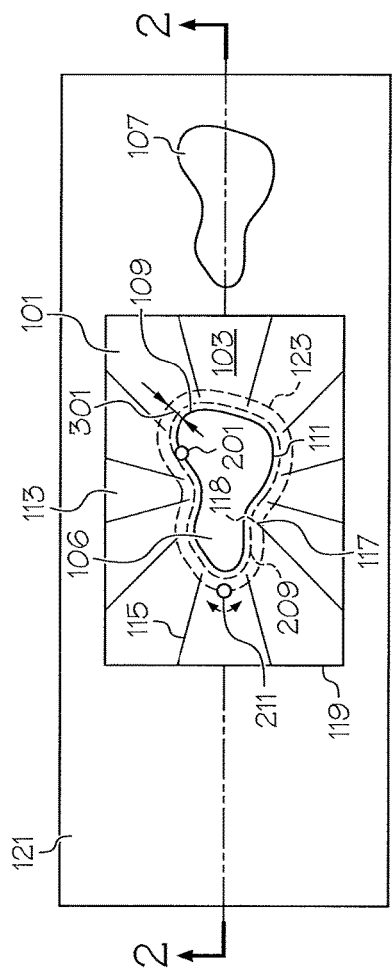
FIG. 1 illustrates a top view of a glass sheet positioned on a conveyor belt.

Methods will now be described more fully hereinafter with reference to the accompanying drawings in which example embodiments of the disclosure are shown. Whenever possible, the same reference numerals are used throughout the drawings to refer to the same or like parts. However, this disclosure may be embodied in many different forms and should not be construed as limited to the embodiments set forth herein.

There is a desire to provide glass panes of a reduced thickness. Such glass panes may be used, for example, to provide light weight vehicle windows that reduce gas mileage and vehicle emissions compared to vehicles incorporating conventional window configurations. There is a further desire to provide manufacturing techniques to process glass panes from relatively thin glass sheets that are free from defects that may be generated by conventional processing techniques. Particular features of the disclosure can allow breaking away of a glass pane from a glass sheet without complications that might otherwise occur during processing of thin glass sheets having a thickness of less than about 1.6 mm, such as from about 0.5 mm to about 1.6 mm, such as from about 0.5 mm to about 1.1 mm.

Figure 5:
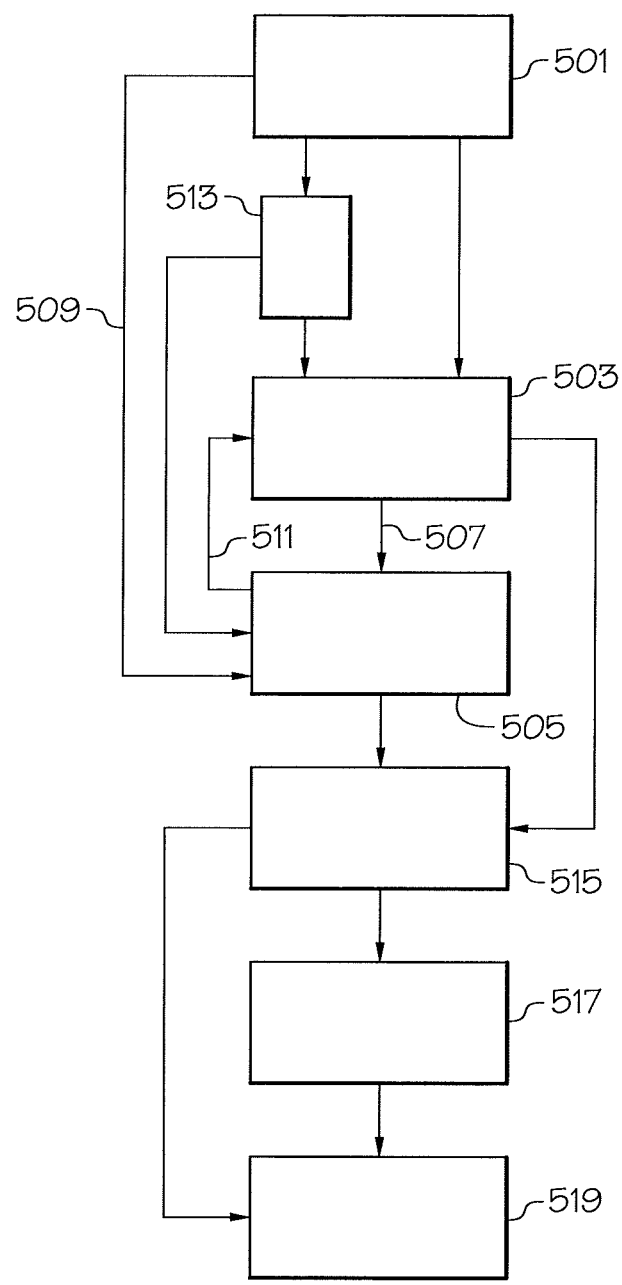
FIG. 5 is a flow chart illustrating example method steps carried out in accordance with example methods of the disclosure.

Referring to FIG. 5, methods of manufacturing a glass pane can include the step 501 of providing a glass sheet. Glass sheets can be provided in a wide range of ways, for example, the glass sheets may be obtained from a glass ribbon produced by way of a down-draw, up-draw, float, fusion, press rolling, slot draw or other glass forming process techniques. In just one example, a glass ribbon may be fusion down-drawn from a forming wedge to produce glass having pristine surfaces. Moreover, the glass ribbon can be drawn with a thickness of less than about 1.6 mm thick, such as from about 0.5 mm to about 1.6 mm, such as from about 0.5 mm to about 1.1 mm thick. As such, glass sheets may be provided from the glass ribbon with an appropriate size by various separation techniques (e.g., mechanical and/or laser scoring or breaking techniques).

Figure 2:
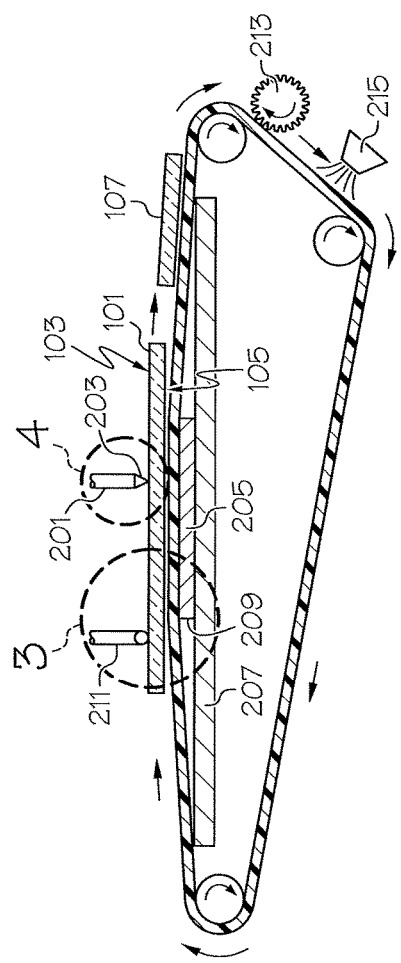
FIG. 2 is a cross sectional view along line 2-2 of FIG. 1.

Turning to FIGS. 1-3, the glass sheet 101 can be provided with a thickness "T" of less than about 1.6 mm thick, such as from about 0.5 mm to about 1.6 mm, such as from about 0.5 mm to about 1.1 mm thick, between a first major surface 103 and a second major surface 105 of the glass sheet 101. The glass sheet 101 can be substantially flat although the glass sheet 101 can include a curved shape depending on the application of the glass pane 107 produced by the methods of the disclosure. The glass sheet 101 can be formed from a wide range of glass materials depending on the particular application. In one example, the glass sheet 101 is formed from a glass material that, after processing to form the final glass pane configuration, may be chemically strengthened (e.g., by ion exchange strengthening) to provide a durable and light weight glass pane. For example, the glass sheet 101 may comprise aluminosilicate glass, alkali-aluminoborosilicate glass or other glass formulations that may be processed to obtain a glass pane 107 broken away from the glass sheet 101 as described more fully below. Once processed into the final shape, the glass pane 107 can be subsequently chemically strengthened to provide a final glass pane configuration with chemically strengthened properties.

As shown in FIG. 5, the method can further include the step 503 of scoring the first major surface 103 of the glass sheet 101 to provide a boundary score line 109 shown in FIGS. 1 and 3. The boundary score line 109 can comprise a fissure, groove or other surface imperfection that can act to concentrate stress during a separation procedure. The boundary score line 109 can be substantially continuous or may comprise a series of discontinuities aligned with one another to collectively define the boundary score line. As shown in FIG. 3, the boundary score line 109 can include a boundary score depth D1. The boundary score depth D1 may be selected to be relatively shallow to reduce chipping and other defects in a central target area 106 of the glass sheet 101. Increasing the depth may have the benefit of allowing easy breaking along the score line with reduced force requirements. However, scoring a relatively deep score line can result in excessive chips, cracks or other imperfections being left at the periphery of the central target area. In some examples, the method scores the first major surface 103 such that the boundary score depth D1 is from about 10% to about 20% of the thickness "T" of the glass sheet 101. Providing the boundary score line 109 with a score depth D1 of from about 10% to about 20% of the thickness "T" of the glass sheet 101 can help minimize excessive chips, cracks and other imperfections in the periphery of the central target area while allowing appropriate propagation of a separating crack along the boundary score line when separating the glass pane 107 from the glass sheet 101.

As shown in FIG. 1, the boundary score line 109 at least partially circumscribes a central target area 106 of the glass sheet 101. For example, the boundary score line 109 can comprise a closed loop boundary score line that entirely circumscribes the central target area 106 that may be broken into the glass pane 107. The boundary score line 109 defines a separation line 111 between the central target area 106 and an outer peripheral area 113 of the glass sheet 101. The outer peripheral area 113 at least partially circumscribes the central target area 106 of the glass sheet 101. For example, as shown in FIG. 1, the outer peripheral area 113 can entirely circumscribe the central target area 106 with the separation line 111 comprising a closed loop separation line between the central target area 106 and the outer peripheral area 113.

As shown in FIG. 5, the method can further include the step 505 of scoring to provide at least one relief score line. The relief score line can comprise a fissure, groove or other surface imperfection that can act to concentrate stress during a separation procedure. The relief score line can be substantially continuous or may comprise a series of discontinuities aligned with one another to collectively define the relief score line. As shown by arrow 507, the step 505 can be carried out after the step 503 of scoring to provide the boundary score line 109 discussed above. As shown by arrow 509, in further examples, the step 505 of scoring to provide the relief score line can be carried out first and then, as shown by arrow 511, the method can subsequently proceed to the step 503 of scoring to provide the boundary score line. In further examples, the boundary score line and the relief score line may be scored at the same time or in other ordered time arrangements.

With respect to the step 505, as shown in FIG. 1, the method can include the step of scoring the first major surface 103 of the glass sheet 101 to provide at least one relief score line 115 defined in the outer peripheral area 113 and extending towards the boundary score line 109. As shown in FIG. 1, although a single relief score line is possible, multiple relief score lines may be provided that are radially spaced about the central target area 106 and each extend in a direction towards the central target area 106. For example, as shown, the plurality of relief score lines 115 can optionally be arranged with the central target area 106 in a hub and spoke pattern with the central target area 106 comprising the hub with the relief score lines 115 extending as radial spokes extending radially away from the central target area 106 and spaced radially about the central target area 106. Providing the relief score lines 115 can help reduce the force necessary to break away the central target area 106 from the glass sheet 101 along the separation line 111 and can also permit breaking away of glass panes that have relatively complex shapes. Moreover, providing a plurality of relief score lines 115 can provide controlled breaking away of portions of the outer peripheral area 113 to help provide a controlled breaking away of the central target area 106 from the glass sheet 101 while helping isolate the central target area 106 from stress concentrations and other conditions that may generate imperfections in the surfaces or edge portions of the central target area 106.

As shown in hidden lines in FIG. 3 the relief score line 115 can include a relief score depth D2. In some examples, as shown, the relief score depth D2 is greater than the boundary score depth D1. For example, some methods can score the first major surface 103 of the glass sheet 101 such that the relief score depth D2 is from about 20% to about 50% of the thickness "T" of the glass sheet 101. Increasing the depth of the relief score depth D2 can be beneficial to facilitate propagating a crack along the relief score line 115 with a reduced level of force. Moreover, increased chips, cracks or other imperfections resulting from the relatively deep relief score line 115 during the scoring process is not a concern since the outer peripheral area 113 including these imperfections will be subsequently broken away and removed from the vicinity of the glass pane 107. As such, any imperfections resulting in the relatively deep relief score line 115 will be carried by the outer peripheral area 113 of the glass sheet and will not contaminate the central target area 106.

Scoring of the boundary score line 109 and/or the relief score line 115 can be carried out with a wide range of techniques. In one example, the method of scoring can be carried out by a scoring device 201 with a scoring wheel 203 that may comprise a polycrystalline diamond although other cutting materials may be used in further examples. Furthermore, the scoring wheel can have a sharp tip angle. As shown in FIG. 4, the tip angle "A" of the scoring wheel 203 can be in a range from about 110° to about 125° although other tip angles may be provided in further examples. In further examples, the scoring wheel 203 can include a diameter of about 3 mm although other sized scoring wheels may be used in further examples.

The scoring device 201 may be driven by a motor under a computer numeric controller (CNC) or other automated system that may carry out the scoring techniques in the desired pattern. Moreover, the scoring device 201 may be operated to create both the boundary score line 109 and the relief score line 115 although different scoring devices may be provided in further examples. In one example, the downward force being applied by the scoring device 201 can be controlled to achieve the desired depths depending on various parameters such as the tip angle, scoring wheel material, glass properties, sheet thickness and other parameters. In some examples, the downward force applied by the scoring device 201 can be greater when creating the relief score lines 115 to create a larger relief score depth D2 when compared to the force used to create the boundary score line 109. For example, the scoring device 201 can be used to score with a downward force within a range of from about 45 N to about 55 N to create the boundary score line 109 with the boundary score depth D1 of from about 10% to about 20% of the thickness "T" of the glass sheet 101. The scoring device 201 can also be used to score with a downward force within a range of from about 55 N to about 65 N to create the relief score line 115 with the relief score depth D2 of from about 20% to about 50% of the thickness "T" of the glass sheet 101.

In some examples, a scoring wheel of 3 mm in diameter and a controlled down-force in the range of 45 N to 55 N and a scoring speed ranging from 30 m/min to 150 m/min can result in a uniform score line on the whole path with its damage (median cracks) depth around 100 µm, while the size of the edge chipping can be significantly reduced to less than 30 µm.

In one example, during step 505, the method can include scoring the first major surface 103 such that the at least one relief score line 115 extends toward the boundary score line 109 to an end point 117 located within the outer peripheral area 113 and spaced by a gap 118 from the boundary score line 109. For example, if the step 503 of scoring the boundary score line 109 is carried out first, the relief score lines 115 can be scored beginning at the end point 117 and then scored in a direction towards the outer edge 119 of the glass sheet 101. Alternatively, the relief score lines 115 can be scored starting from the outer edge 119 and then scored in a direction towards the boundary score line 109 and ending at the end point 117 such that the gap 118 exists between the boundary score line 109 and the relief score line 115. If the step 505 is carried out before step 503, then the boundary score line can be provided during step 503 in such a way that the gap 118 exists between the corresponding end point 117 and the boundary score line 109. Providing the gap 118 helps prevent damage to the central target area 106 that might otherwise occur by imperfections at the end point of the relief cut passing over the separation line 111 and damaging the periphery of the central target area 106.

As further shown in FIG. 5, the method may further include an optional step 513 of placing the glass sheet 101 on a conveyor belt 121. The conveyor belt 121 can be helpful to promote automatic processing along an assembly line to quickly produce a plurality of glass panes 107. In some further examples, the conveyor belt 121 includes a Shore A hardness of greater than or equal to 70. Providing a relatively hard conveyor belt 121 with a Shore A hardness of greater than or equal to 70 can help with the scoring procedure, particularly with respect to scoring of the boundary score line 109. Indeed, providing the conveyor belt 121 with a Shore A hardness of greater than or equal to 70 can help prevent localized bending of the glass sheet 101 when scoring the boundary score line 109, thereby helping minimize chips, cracks, or other defects that may otherwise damage the central target area 106. The conveyor belt 121 can also include a relatively fine texture to further help prevent localized bending of the glass sheet 101. For example, conveyor belt 121 can be provided with a relatively fine texture, for example, having a feature height of less than 0.5 mm and a feature spacing of less than 0.5 mm. For example, the support surface topography of conveyor belts 121 is frequently rough and therefore not substantially smooth. The rough surfaces have features, such as peaks in the rough surface that can have a height of less than 0.5 mm and a spacing of less than 0.5 mm help prevent localized bending of the glass sheet 101. In further examples, the support surface topography of the conveyor belts 121 may have a substantially smooth surface with substantially no appreciable surface features or surface features that have a height and spacing of significantly less than 0.5 mm.

The conveyor belt can also be provided with cleaning mechanisms, such as continuous cleaning mechanisms, designed to remove surface debris from contaminating the surface of the conveyor belt 121 used to support the glass sheet 101. For example, as shown in FIG. 2, the conveyor belt 121 may be provided with a rotating brush 213 that may be used in a wet or dry environment. In addition or alternatively, the conveyor belt 121 may be provided with a single or an array of fluid cleaning nozzle(s) 215. In one example, an array of cleaning nozzles 215 is provided through which an air or water jet is used to clean the surface of the conveyor belt 121. The cleaning agent can be dry air or any harmless liquid or any combination to achieve the goal of belt cleaning. The rotating brush 213 and/or fluid cleaning nozzle 215 can remove glass chips, glass shards, or other hard particles or debris from the vicinity of the conveyor belt 121 to prepare the conveyor belt to support another glass sheet 101 for processing. Cleaning the conveyor belt 121 may be particularly beneficial for relatively hard conveyor belts having a Shore A hardness of greater than or equal to 70 being used to support a relatively thin sheet of glass since any debris may be forced against the glass sheet 101 by the noncompliant relatively hard conveyor belt that may cause damage (e.g., chipping, cracking, scratching, etc.) to the second major surface 105 being supported by the surface of the conveyor belt 121.

The combination of the relatively hard conveyor belt having a Shore A hardness of greater than or equal to 70 in combination with use of a scoring wheel 203 of polycrystalline diamond or similar material that has a sharp tip angle (e.g., a tip angle A of from about 110° to about 125°) can be particularly useful in combination to help provide a clean boundary score line 109 with desired boundary score depth D1 (e.g., boundary score depth D1 of from about 10% to about 20% of the thickness "T" of the glass sheet 101) with minimal or substantially no chips, cracks and/or other defects contaminating the peripheral portion of the central target area 106.

Referring to FIG. 5, the method can also include the step 515 of breaking away the outer peripheral area 113 of the glass sheet 101 from the central target area 106 of the glass sheet 101 along the separation line 111. In one example, a force can be applied in the outer peripheral area 113 wherein cracks may propagate along the relief score lines 115, through the gap 118, to the boundary score line 109 and then along the separation line 111 to break away the outer peripheral area 113 from the central target area 106 to provide the glass pane 107. In examples including the plurality of relief score lines 115 shown in FIG. 1, the relief score lines 115 can help divide the outer peripheral area 113 in sections so that different sections of the outer peripheral area 113 may be easily broken away from the central target area 106.

In one example, the step 515 of breaking away can include applying a breaking force along a force application path 123 positioned within the outer peripheral area 113 and circumscribing the central target area 106. As shown, in one example, the force application path 123 has a shape that is geometrically similar to the shape of the separation line 111. In one example, the force application path 123 is spaced a distance 301 from the separation line of from about 6 mm to about 18 mm. As such, application forces and/or bending moments may be maintained substantially consistent about the periphery of the central target area 106. In one example, a press member may include a plunger member having a shape matching the shape of the force application path 123. For instance, the plunger may comprise a peripheral ring that may be forced to simultaneously press each portion of the force application path 123 to break away all portions of the outer peripheral area 113 at substantially the same time.

In further examples, the step 515 of breaking away can be carried out by applying the breaking force with a force applicator 211 that travels along the force application path 123. Referring to FIG. 3, in one example, the force applicator 211 can include a rolling breaking head 303 made of, for example, polyamide or steel covered with rubber and in a diameter of from about 10 mm to about 25 mm, such as from about 10 mm to about 15 mm. The force applicator 211 can be operated with a controlled approaching force, such as less than 30 N (i.e., 30 Newtons) to avoid localized impact that may otherwise shatter the glass sheet. In such examples, a computer system may move the force applicator 211 in three directions in any desired path under a variety of controlled down-forces such that sections of the outer peripheral area 113 positioned between respective relief score lines 115 can be successively broken away in a controlled manner to avoid excessive force build up with a relatively violent breaking event that might occur when attempting to break away the entire outer peripheral area 113 at substantially the same time.

The step of breaking away can also include the step of supporting the conveyor belt 121 with a substantially rigid template 205. The template 205 can be made from a number of stiff materials such as plastic or metal, with its bulk modulus being, for example, about 4 GPa or greater. In one example, the template 205 can have an outer periphery 209 defined by an outer edge of the template 205 that defines a shape having a larger footprint than a footprint of the central target area 106. For example, as apparent by the outer periphery 209 shown in hidden lines underneath the conveyor belt 121 in FIG. 1, the outer periphery 209 is geometrically similar to the separation line 111 and defines a footprint that is larger than a footprint of the central target area 106. As shown in FIG. 3, the template 205 can be aligned with the central target area 106 such that an oversize dimension 305 between the outer periphery 209 of the template 205 and the separation line 111 is from about 1.5 mm to about 3 mm. The oversize dimension 305 can facilitate a pivot point about the outer periphery 209 to facilitate breaking Although not shown, the central portion of the template 205 can include a pattern of vacuum ports that may be aligned with similar vacuum ports in the conveyor belt 121 to facilitate releasable holding of the central target area 106 against the conveyor belt. As such, the central target area 106 can be held by vacuum against the conveyor belt 121 during scoring and/or breaking steps of the disclosure. Relatively small vacuum ports may be provided (e.g., less than ⅛ inch) to allow stability and inhibit bending of the glass sheet during the process of scoring the glass sheet.

As further illustrated in FIG. 3, the template can likewise include a thickness 307 of from about 1.5 mm to about 3 mm. Such a template thickness can allow appropriate bending of the outer peripheral area 113 to carry out the breaking away of the outer peripheral area 113 from the central target area 106.

As shown in FIG. 3, the specific dimensional configuration set up can provide a beneficial breaking environment to effectively break away the outer peripheral area 113 from the central target area 106 with a glass sheet having a thickness of less than 1.6 mm, such as from about 0.5 mm to about 1.6 mm, such as from about 0.5 mm to about 1.1 mm. In such an example, the method can include the step 501 of providing the glass sheet 101 with the thickness of from about 0.5 mm to about 1.6 mm between a first major surface 103 and the second major surface 105 of the glass sheet 101. The method can then include the step 513 of placing the glass sheet 101 on the conveyor belt. The conveyor belt 121 can be supported by the substantially rigid template 205, for example, including a thickness 307 of from about 1.5 mm to about 3 mm. The conveyor belt 121 can be supported by the template 205 during the scoring steps 503 and/or 505 although these scoring steps may be carried out while the conveyor belt 121 is supported by a substantially rigid conveyor support member 207.

Whether or not supported by the template 205 or the support member 207, the method can then include the step 503 of scoring the first major surface 103 supported by the conveyor belt 121, such as the conveyor belt including the Shore A hardness of greater than or equal to 70 and/or including or provided with other features discussed above. The step 503 of scoring the first major surface 103 supported by the conveyor belt 121 can provide the boundary score line 109 at least partially, such as entirely, circumscribing the central target area 106 of the glass sheet 101 to define the separation line 111 between the central target area 106 and the outer peripheral area 113 of the glass sheet 101. The outer peripheral area 113 at least partially, such as entirely, circumscribes the central target area 106 of the glass sheet 101.

Whether or not supported by the template 205 or the support member 207, the method further includes the step 505 of scoring the first major surface 103 of the glass sheet 101 supported by the conveyor belt 121 to provide at least one relief score line 115 defined in the outer peripheral area 113 and extending toward the boundary score line 109.

The rigid template 205 can include a footprint that is larger than a footprint of the central target area 106 and wherein the template includes an outer periphery that is geometrically similar to the separation line 111. The method further includes the step of aligning the template 205 with the central target area 106 such that an oversize dimension 305 between the outer periphery 209 of the template 205 and the separation line 111 is from about 1.5 mm to about 3 mm.

The method can then include the step 515 of applying a breaking force with the force applicator 211 traveling along the force application path 123 positioned within the outer peripheral area 113 and circumscribing the central target area 106 to break away the outer peripheral area 113 of the glass sheet 101 from the central target area 106 of the glass sheet 101 along the separation line 111. In such examples, the force application path can be spaced breaking offset 301 from the separation line 111 of from about 6 mm to about 18 mm and apply a controlled breaking force, for example, of from about 40 N to about 70 N. In some examples, the thickness 307 of the template 205, oversize dimension 305 of the template, and breaking offset 301 can be designed such that the bending stress generated under the down-force of the force applicator 211 is greater than or equal to 70 MPa along the boundary score line 109.

Once the glass pane 107 is broken away from the glass sheet 101, the glass pane may be further processed as indicated by step 517 shown in FIG. 5. For example, the glass pane may be shaped in some examples to provide a desired glass surface topography over the first and second major surfaces of the glass sheet. Alternatively, any shape of the glass pane may be a result of prior shaping of the glass sheet before conducting the score/break procedures of this disclosure. In further examples, the edges of the glass pane may be ground to remove glass imperfections and/or to fine tune the shape of the glass pane. The edges can also be polished or otherwise processed to help further remove small imperfections to thereby strengthen the edges of the glass pane 107.

The glass pane 107 can further be processed by chemical strengthening as indicated by step 519 shown in FIG. 5. In one example, the glass panes can be chemically strengthened into glass panes comprising Corning® Gorilla® glass from Corning Incorporated. Such chemically strengthened glass, for example, may be carried out in accordance with U.S. Pat. Nos. 7,666,511; 4,483,700 and 5,674,790. Chemical strengthening may be carried out by an ion exchange process. For instance, after producing the glass pane discussed above from the glass sheet (e.g., aluminosilicate glass, alkali-aluminoborosilicate glass) made by fusion drawing and breaking away the glass pane from the glass sheet, the glass pane may then be chemically strengthened by immersing the glass pane in a molten salt bath for a predetermined period of time. Ions within the glass pane at or near the surface of the glass pane are exchanged for larger metal ions, for example, from the salt bath. In one embodiment, the temperature of the molten salt bath is about 430° C. and the predetermined time period is about 8 hours. In another embodiment, the temperature of the molten salt bath is nearly 450° C. and the predetermined time period is about 4.5 hours.

The incorporation of the larger ions into the glass strengthens the glass pane by creating a compressive stress in a near surface region. A corresponding tensile stress is induced within a central region of the glass pane to balance the compressive stress.

The chemical strengthening process of Corning® Gorilla® glass can be used to strengthen the pane 107. Once strengthened, the glass pane can have a relatively high compressive stress (e.g., from about 700 MPa to about 730 MPa; and even capable of greater than 800 MPa) at a relatively deep depth from the surface (e.g., about 40 microns; and even capable of greater than 100 microns). Such glass can have a high retained strength and high resistance to scratch damage, high impact resistance, high flexural strength as well as a pristine surface. One example glass composition can comprise $SiO_2$, $B_2O_3$ and $Na_2O$, where $(SiO_2+B_2O_3) \geq 66$ mol. %, and $Na_2O \geq 9$ mol. %.

In further examples, the chemically strengthened glass pane 107 can comprise an acid-etched glass sheet to further strengthen the glass pane. The acid etching step, in some examples, can remove from about 1.5 to about 1.7 microns from the surfaces of the chemically strengthened glass pane 107. Acid etching addresses the fact that glass strength is extremely sensitive to the size and the tip shape of surface flaws. By removing the above-mentioned surface layer, the acid etching can clear away a majority of surface flaws smaller than 1 micron. While acid etching may not remove larger flaws, the acid etching procedure will tend to round the flaw tip which would otherwise dramatically decrease the stress concentration factor. The improvement in glass surface (e.g., removal of small surface flaws and rounding the tips of larger flaws) can dramatically increase glass strength, such as impact resistance. Moreover, only a relatively small depth of glass is removed, that will not result in significant compressive stress drop in the chemically strengthened glass pane which has relatively high compressive stress at a much larger depth into the glass sheet such as 40 microns from the surface, or even greater than 100 microns in some examples.

In one example, the acid etching step can be conducted on a horizontal spray etching system, with a chemical solution of 1.5M HF/0.9M $H_2SO_4$. The other process parameters can include process temperature of 90° F. (32.2° C.), process time of 40 seconds, spray pressure of 20 psi, spray oscillation of 15 cycles per minute, and using 0.48 gallon-per-minute conical spray nozzles. After acid etching, the processed glass pane may be cleaned with a rinse step using water, with the spray pressure of 20 psi and through 0.3 gallon-per-minute fanjet pattern nozzles. Then, the acid-etched chemically strengthened glass pane may be dried under 5 hp air turbine supplying air with an air flow dryer system Methods of the disclosure can provide stable scoring of thin glass, for example, less than about 1.6 mm thick, such as from about 0.5 mm to about 1.6 mm, such as from about 0.5 mm to about 1.1 mm thick, without introducing excessive chipping along the edge of the glass pane. Moreover, methods of the disclosure can enable fully automated breaking along a curved score line with exceptional edge quality and process yield. Still further, methods of the disclosure can improve process stability by introducing a cleaning step of the conveyor belt that may prove particularly useful for processing with conveyor belts having a Shore A hardness of greater than or equal to 70. Still further methods of the disclosure may be used with high speed processing techniques with processing equipment for production of vehicle glass. Still further, methods of the disclosure can provide scoring and breaking of thin glass sheets for formation of glass panes comprising chemically strengthened glass such as Corning® Gorilla® glass.

Methods of the disclosure can provide glass panes of a reduced thickness and having various peripheral shapes and can be substantially flat or curved or other shapes suitable for the particular application. In one example, glass panes that are substantially curved may be provided with various peripheral shapes. As such, methods of the disclosure are particularly suited for fully automated scoring and breaking of thin glass sheets into complex curved shaped glass panes that may provide for various applications, such as use as vehicle windows. The reduced thickness of the windows provides glass with relatively less weight when compared to existing window configurations. As such, the glass panes of the present disclosure can facilitate reduction in the overall weight of the vehicle and a corresponding reduction in the gas mileage and $CO_2$ emissions of the vehicle. Techniques of the methods of the disclosure allow processing of thin glass sheets into thin glass panes with reduced damage to the edges and major surfaces of the glass pane that may otherwise result in reduced strength, such as reduced edge strength of the glass panes. Moreover, the glass panes of enhanced quality can be further processed by finishing the edges and can also include chemical strengthening techniques, for example, to provide the glass panes as Corning® Gorilla® glass. Still further techniques may be conducted, such as acid etching to further strengthen the glass pane. As such, glass panes may be provided that are not only lower weight, but can also comprise higher strength glass panes that can facilitate formation of light-weight vehicle windows with a strong structural configuration that can resist damage from debris or other environmental factors typically encountered by vehicle windows. Still further, the glass panes can be formed from high-quality display glass to allow enhanced viewing through the windows by the operator and passengers of the vehicle.

It will be apparent to those skilled in the art that various modifications and variations can be made to the present disclosure without departing from the spirit and scope of the invention. Thus, it is intended that the present invention cover the modifications and variations of this disclosure provided they come within the scope of the appended claims and their equivalents.

What is claimed is:

1. A method for automated scoring and breaking of a glass pane comprising the steps of:
   (I) providing a glass sheet with a thickness of less than about 1.6 mm between a first major surface and a second major surface of the glass sheet;
   (II) scoring the first major surface of the glass sheet to provide a boundary score line with a pre-determined boundary score depth ranging from about 10% to about 20% of the thickness of the glass sheet, wherein the boundary score line at least partially circumscribes a central target area of the glass sheet to define a separation line between the central target area and an outer peripheral area of the glass sheet, and wherein the outer peripheral area at least partially circumscribes the central target area of the glass sheet;
   (III) scoring the first major surface of the glass sheet to provide at least one relief score line with a pre-determined relief score depth ranging from about 20% to about 50% of the thickness of the glass sheet, wherein the relief score line is defined in the outer peripheral area and extends toward boundary score line, and wherein the relief score depth is greater than the boundary score depth; and
   (IV) breaking away the outer peripheral area of the glass sheet from the central target area of the glass sheet along the separation line.

2. The method of claim 1, wherein step (III) provides the at least one relief score line as a plurality of relief score lines that are radially spaced about the central target area and each extend in a direction towards the central target area.

3. The method of claim 1, wherein step (IV) includes applying a breaking force along a force application path positioned within the outer peripheral area and circumscribing the central target area.

4. The method of claim 3, wherein step (IV) includes applying the breaking force with a force applicator that travels along the force application path.

5. The method of claim 3, wherein step (IV) provides the force application path spaced a distance from the separation line of from about 6 mm to about 18 mm.

6. The method of claim 1, wherein step (III) scores the first major surface such that the at least one relief score line extends toward the boundary score line to an end point located within the outer peripheral area and spaced by a gap from the boundary score line.

7. The method of claim 1, wherein the boundary score line entirely circumscribes the central target area of the glass sheet.

8. The method of claim 1, wherein the outer peripheral area entirely circumscribes the central target area of the glass sheet.

9. The method of claim 1, wherein the at least one relief score line is scored before scoring the boundary line or the at least one score line and the boundary line are scored at the same time.

* * * * *